US008020174B2

(12) United States Patent
Sedogbo et al.

(10) Patent No.: US 8,020,174 B2
(45) Date of Patent: Sep. 13, 2011

(54) METHOD FOR MAKING USER-SYSTEM INTERACTION INDEPENDENT FROM THE APPLICATION OF INTERACTION MEDIA

(75) Inventors: Celestin Sedogbo, Beynes (FR); Pascal Bisson, Paris (FR); Olivier Grisvard, Palaiseau (FR); Jean Jourdan, Villiers sur Orge (FR); Thierry Poibeau, Fontenay aux Roses (FR)

(73) Assignee: THALES, Paris (FR)

( * ) Notice: Subject to any disclaimer, the term of this patent is extended or adjusted under 35 U.S.C. 154(b) by 0 days.

(21) Appl. No.: 10/529,045

(22) PCT Filed: Sep. 29, 2003

(86) PCT No.: PCT/FR03/02853
§ 371 (c)(1),
(2), (4) Date: Mar. 24, 2005

(87) PCT Pub. No.: WO2004/029799
PCT Pub. Date: Apr. 8, 2004

(65) Prior Publication Data
US 2005/0289560 A1 Dec. 29, 2005

(30) Foreign Application Priority Data
Sep. 27, 2002 (FR) .................................. 02 12012

(51) Int. Cl.
*G06F 9/44* (2006.01)
*G06F 15/16* (2006.01)
(52) U.S. Cl. ...................................... 719/320; 709/227
(58) Field of Classification Search .................. 719/320
See application file for complete search history.

(56) References Cited

U.S. PATENT DOCUMENTS

| 5,960,200 | A | 9/1999 | Eager et al. |
| 6,360,249 | B1 | 3/2002 | Huddleston et al. |
| 6,470,340 | B1 * | 10/2002 | Kawai et al. ..................... 707/10 |
| 6,829,603 | B1 * | 12/2004 | Chai et al. ........................ 707/5 |
| 6,973,174 | B1 * | 12/2005 | Koptiw et al. ................... 726/26 |
| 7,010,536 | B1 * | 3/2006 | De Angelo ..................... 707/100 |
| 7,092,928 | B1 * | 8/2006 | Elad et al. ....................... 706/60 |
| 7,103,644 | B1 * | 9/2006 | Zhang et al. ................... 709/219 |
| 2002/0107852 | A1 * | 8/2002 | Oblinger .......................... 707/5 |
| 2002/0120571 | A1 | 8/2002 | Maung et al. |
| 2003/0028498 | A1 * | 2/2003 | Hayes-Roth .................... 706/17 |
| 2003/0117436 | A1 * | 6/2003 | Kautto-Koivula et al. ... 345/762 |
| 2004/0073874 | A1 | 4/2004 | Poibeau et al. |
| 2006/0100884 | A1 * | 5/2006 | Thorner ........................ 704/275 |

FOREIGN PATENT DOCUMENTS

| WO | 01 98936 | 12/2001 |
| WO | 02 03648 | 1/2002 |
| WO | WO 02073331 A2 * | 9/2002 |

OTHER PUBLICATIONS

U.S. Appl. No. 09/701,384, filed Dec. 1, 2000, Juliette Mattioli (Not Yet Published).

* cited by examiner

*Primary Examiner* — Andy Ho
*Assistant Examiner* — Abdou K Seye
(74) *Attorney, Agent, or Firm* — Lowe Hauptman Ham & Berner, LLP

(57) ABSTRACT

The method of the invention consists, in a system of the type with three "tiers", in inserting a fourth "tier" which is the business interaction and which makes it possible to obtain a user-system interaction component that is independent of the services of the application and of the media.

4 Claims, 3 Drawing Sheets

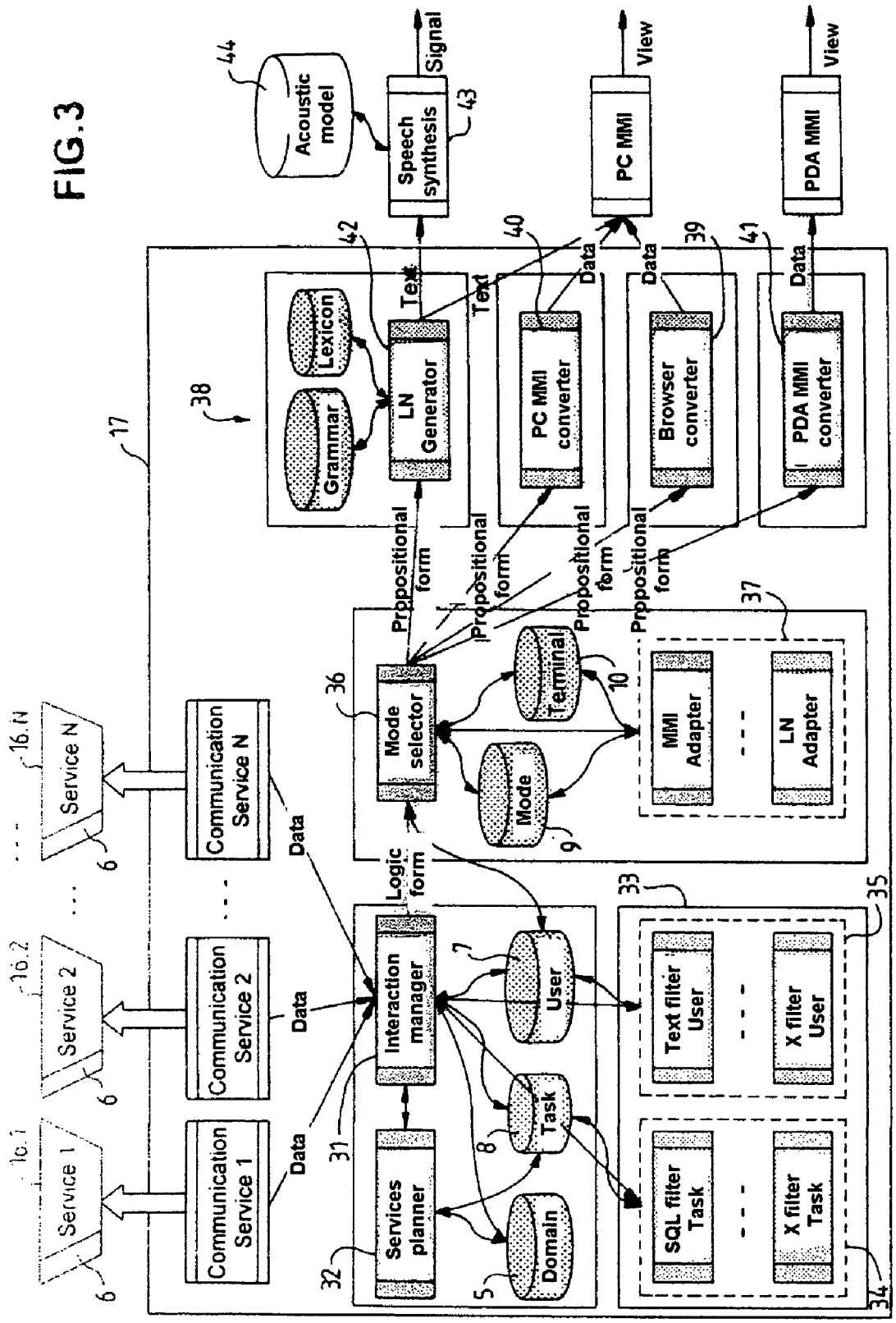

METHOD FOR MAKING USER-SYSTEM INTERACTION INDEPENDENT FROM THE APPLICATION OF INTERACTION MEDIA

CROSS - REFERENCE TO RELATED APPLICATIONS

The present Application is based on International Application No. PCT/FR2003/002853, filed on Sep. 29, 2003, which in turn corresponds to FR 02/12012 filed on Sep. 27, 2002, and priority is hereby claimed under 35 USC §119 based on these applications. Each of these applications are hereby incorporated by reference in their entirety into the present application.

1. Field of the Invention

The present invention pertains to a method making it possible to render user-system interaction independent of the application and of the interaction media.

2. Description of Related Prior Art

In systems intended for use by humans, the processes for managing the interaction between the users and the system are currently distributed between the application proper, namely the component responsible for rendering the services for which the system has been designed, and the media for interaction with the system, that is to say the component or components responsible for effecting the interface which allows the users to access these services. Moreover, the interaction processes are frequently deeply buried in one or the other of these components and embedded with the processes of the application or of the interfaces, thereby making them difficult to identify as separate interaction processes.

This dispersal of the interaction processes stems from the absence of clear separation between the applications and their interfaces in traditional systems. Even if this separation is seriously envisaged as a solution to the problem of the management of user-system interaction, especially in multi-tier architectures, its implementation is confronted with a certain number of difficulties. On the one hand, one and the same service of the application may be used by several different interaction media in potentially very dissimilar contexts of use, in which case the management of the user-system interaction is under the remit of the interfaces. On the other hand, one and the same interaction scheme may be applied to several distinct services of the application, in which case it frequently happens that the interaction services are as it were factorized in the application.

Documents U.S. Pat. No. 5,960,200 and WO 02 03648 disclose systems with "multi-tier" architecture, but no clear separation is provided for between the "presentation", "interaction with the user" and "application" layers and/or no provision is made to render the "interaction" layer specific to each user.

The consequence of this state of affairs is that any enhancement to the requirements of the users in terms of interaction with the system, for example in case of a change of physical or logical context of use, impacts both the application and also the interfaces. This involves appreciable costs in terms of deployment, enhancement and maintenance of the systems. Specifically, the adaptation of a system to new users or new interaction media will require the design and development of new interfaces, this possibly seeming normal given the heterogeneity of the contexts of use, but also the revision of a good part of the application, this already being less so, in particular if reference is made to the principles of object-based design methodology. Conversely, the extension of the functionalities of the system by the addition or modification of services of the application will require the revision of the whole set of interfaces, this possibly also turning out to be very expensive.

SUMMARY OF THE INVENTION

A subject of the present invention is a method making it possible, within the framework of interaction between an application and interaction media, to easily adapt the system for implementing interaction to the application and to the interaction media, as well as to any enhancement of the context of the interaction, in particular upon a physical or logical change of use, the taking into account of new users, of new terminals and upon the addition or modification of services of the application.

The method of the invention, making it possible to render interaction independent of the application and of the interaction media, is characterized in that a container is created in which is stored at least one of the following representations of the interaction context: representation of the terminals that can be used by the users, representation of the modes of action, representation of the modes of perception of the exchanges of information by the users, representation of activity of the users, representation of context, representation of the services expected, and it is characterized in that the PSIC provides for the interaction by using the representations to construct, adapt and manipulate knowledge bases constituting a structured representation of the context of use of the system, and that with the aid of this structured representation it establishes the dialog between the users and the services of the application.

The device for implementing the inventive method, applied to a system of the type comprising at least one man/machine interface, at least one applications server and one database, is characterized in that a device in which are included intelligent computation systems establishing bidirectional interaction between the user(s) and the system is interposed between the interface and the applications server.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention will be better understood on reading the detailed description of an embodiment, taken by way of nonlimiting example and illustrated by the appended drawing, in which:

FIG. 3 is a detailed block diagram of a system according to the invention and explaining the routing of the information from the servers to the user.

DETAILED DESCRIPTION OF THE INVENTION

Figure 1:
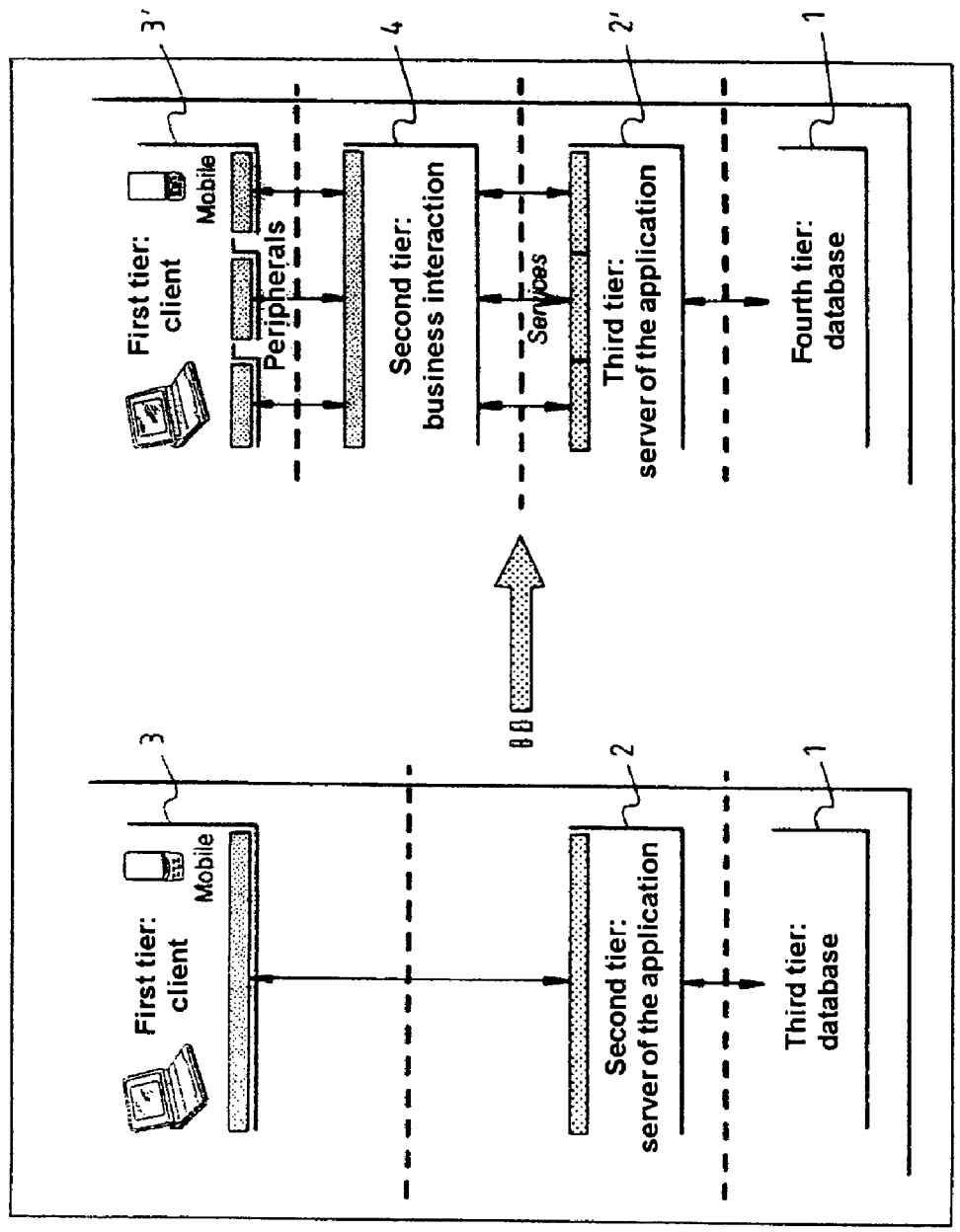
FIG. 1 is a simplified block diagram showing, on one side, a conventional "three-tier" architecture, and on the other side an architecture in accordance with the invention.

To simply illustrate the interaction concepts to which the invention refers, let us consider the case of the control by a user of diverse domestic appliances such as television set, video recorder, satellite receiver, personal computer, personal assistant ("P.D.A"), etc. This user must, on passing from the control of one of these appliances to that of another appliance, make an effort of adaptation to each of the diverse interfaces for controlling these appliances, which are generally very diverse (remote controls, keypad, buttons, etc.). It would therefore be desirable for this user to have to memorize and accustom himself to only the control of a single interface, for example a PDA. Of course, when dealing with appliances more complex than domestic appliances, this requirement to simplify and standardize their control is even more necessary.

By way of example, mention may be made of some of the many many domains of application in which the invention may be implemented, and in which the human takes a predominant place, on account of the fact that these domains involve interaction between the users and the systems used:

Defense: weaponry, command, simulation and training systems;
Transport: steering, supervision, reservation systems;
Communications: telephony, radio, television, internet;
Daily life: electrodomestic systems, private vehicles, ubiquitous domestic computing;
Services: banking systems, e-commerce, technical assistance;
Health: hospital systems, operational aid;
Etc.

To solve these problems, the invention consists firstly in relieving the designers and developers of applications of the issue of the use of these applications within each particular context, thus allowing them to propose generic application services that are easy to maintain, to extend and to reuse. Thereafter, the invention consists in relieving the designers and developers of interfaces of the problem of interaction between the interfaces and the applications, and thus it allows them to propose extendable and reusable interfaces.

The present invention is described hereinbelow with reference to a complex computing system comprising numerous functions, but it is of course understood that it is not limited to such systems, and that it may be implemented in any device, appliance or item of equipment comprising at least one computing layer supporting at least one model representation of a terminal, at least one representation of an application, even in a rudimentary form and at least one computing user interface itself supporting a piece of software.

The method of interaction between users and systems relies on the following fundamental characteristic, which consists in rendering the interaction universal by separating it from the application proper on the one hand and from the media for interaction with the application on the other hand. More precisely, it involves "encapsulating" the human and the context of use of the system within a new component responsible for managing the person-system interaction. This component is by definition independent of the services proposed by the application while still allowing access to these services regardless of the interaction medium and regardless of the physical context within which this medium is used.

By analogy with containers of business objects—that is to say peculiar to a domain of application—developed within the framework of component-based architectures, the method of the invention results in the construction of a container of interaction objects, which is called a person-system interaction container or "PSIC" for short. From the point of view of the architecture of computing systems, this container consists of an intermediate component—"middleware" to use the jargon—for interaction which implements the management of user-system interaction in the form of interaction services that are sufficiently generic to allow dialog between the services of the application and the interface services regardless of what these services are.

Thus, the PSIC separates the application from the client station. This separation involves reducing the application to a set of services, that can thus be regarded as application package services. From the user's side, the interface ("MMI" or man/machine interface) no longer directly calls the functions of the application, but goes via the PSIC, which interprets any action of the interface and generates its own calls to the application package services concerned.

The manner of operation of the interaction container is based on descriptions, in the form of knowledge bases, of the human ("Who is it?"), of his activity ("What is he doing?"), of the context within which this activity occurs ("Where is it?") and of the services rendered by the other components of the system ("How does it do it?"), as well as on a log of the user-system dialog which describes the interaction that has occurred between the user and the system and its evolution over time. On the basis of this knowledge, the container proposes a set of intelligent processing operations which implement user-system interaction via the various interaction media.

A major characteristic of the present invention resides in the identification of a user-system interaction component that is independent of the services of the application on the one hand and of the interaction media on the other hand, this component being hitherto distributed between the application and the interfaces and buried in the services proposed by each of these components, whereas it is integrated with the PSIC of the invention. The method of the invention makes it possible to render the interaction layer independent and has the immediate advantage of allowing designers and developers of applications and of interfaces to concentrate on their prime task, which is to provide their respective services without worrying about their use.

In addition to the introduction into the systems of a clearly identified and localized interaction component, another important characteristic of the invention described here resides in the possibilities offered by this interaction component, in particular the use of user-system dialog mechanisms which take full account of the operational context of the system and of the user. The analysis, interpretation and comprehension of this context give the interaction incomparable power and open up new possibilities to traditional man-machine interfaces. Specifically, whereas the existing interfaces propose a static and fixed interaction that does not evolve along with changes in the context of use, the present invention allows the setting up of dynamic interaction mechanisms that adapt automatically to context and are heavily centered on the users.

An embodiment of the invention, relating to a system organized in layers or "tiers", will now be described with reference to FIG. 1.

So-called three-tier applications are tending to become a standard as regards system architecture. The three-tier design and development scheme relies as illustrated in FIG. 1, on the left, on a well-identified separation between the data layer (tier 1 database), the application layer (tier 2 server of the application) and the interfaces layers (tier 3 client), thereby allowing a distribution of the data and of the processes that is compatible with the current evolution of computing networks and the growing heterogeneity of workstations and the requirements of the users.

In a conventional three-tier application, the management of the interaction between the users and the system is performed by the server of the application—client interfaces pair. Immediately one is confronted in these systems with dispersal of the interaction services between the server layer of the application on the one hand, in respect of everything relating to the interaction processes that are common to the whole set of users and terminals connected to the server, and the client layer on the other hand, in respect of everything concerned with a particular class of users or of terminals or even with a particular user or terminal.

According to a possible embodiment of the present invention illustrated in the right-hand part of FIG. 1, within the framework of three-tier applications, one is dealing with the introduction of a fourth tier corresponding to the PSIC and called the business interaction layer, being responsible as it is for the management of user-system interaction in respect of a particular class of users, that is to say a particular business.

Within the context of the passage to four tiers, the method consisting in rendering the component responsible for user-system interaction independent relies on the clear and precise identification of three distinct classes of services, namely:

The application services proposed by the server of the application;
The interface services proposed by the clients;
The interaction services proposed by the PSIC.

The application services implement the functionalities which are strictly the remit of the application, that is to say the whole set of processes peculiar to the domain of application: algorithms, computations, management of data, etc. From the point of view of the present invention, they must be completely independent of any particular context of use, especially as regards the various potential categories of users or the various classes of terminals via which the users access these services.

The interface services implement the functionalities of perception and of action for a particular class of terminals or even a particular terminal, that is to say the whole set of processes for managing the peripherals: graphical display, sound restitution, keyboard, mouse, microphone, touch screen, etc. From the point of view of the invention described here, they must be independent of the users and, insofar as possible, of the underlying application. It turns out that the latter point cannot always be met in existing equipment especially as regards the presentation of the data of the application which is strongly constrained by the format of these data, and that clients do not wish to modify.

The interaction services are all the services that will allow the users to access the application services via a given terminal—a set of interface services. In order to implement these services, the PSIC has means of representation of the context of interaction between the user and the system. These means of representation allow him to construct and manipulate a set of knowledge bases (regarding the user, the domain, the task, etc.) with the aim of providing the interaction means with the data regarding the context that are necessary for their operation. The means of interaction allow the PSIC to render the interaction services defined hereinabove and rely for this purpose on internal means of communication, peculiar to the PSIC, and external means of communication which provide for the communication with the other layers (server of the application and clients) of the four-tier architecture. These internal and external means of communication effect the infrastructure necessary for the operation of the PSIC. The various means identified here are described more precisely hereinbelow.

The function of the means of representation is the construction, the adaptation and the manipulation of the knowledge bases necessary for the implementation of the interaction services. The latter constitute a structured representation of the context of use of the system. The various knowledge bases identified by the present invention pertain to the following knowledge (see FIGS. 2 and 3):

Domain 5: this is a conceptual representation of the domain of application of the system, for example in the form of an entities-relations scheme. It allows the PSIC to manage the interaction services as a function of the organizational context of the system;

Application 6 (included in services 16.1 to 16.N described hereinbelow): this involves representing the whole set of services of the application that are proposed by the server layer of the application. This allows the PSIC to select the interaction services adapted to the functional context of the system;

The user or users 7: this is information regarding the various classes of users of the system and regarding the various users within these classes, such as for example the profiles or the preferences of these users. They allow the PSIC to configure the interaction services as a function of the operational context from the point of view of the operators;

Task 8: this involves formalizing the task that the user of the system has to carry out, including performance and security constraints, or the collaborative task that the users have to carry out in the case of teamwork. This allows the PSIC to propose the interaction services that are appropriate as a function of the operational context from the point of view of operations;

The modes 9: this involves describing the various modes of perception and of action that are offered by the terminals connected to the system, such as for example displays in two or three dimensions, voice, gesture, etc. This allows the PSIC to implement the interaction services as a function of the logical context of use;

The terminals 10: this involves modeling the various classes of terminals, and the various terminals within these classes, at the disposal of the users so as to interact with the system, especially in terms of input/output peripherals or of possibilities of expression. This allows the PSIC to adapt the interaction services to the physical context of use.

The means of representation, used during the creation and the updating of the PSIC, for the management of these various knowledge bases, divide up into four categories, namely:

1. Means of acquisition: they allow the experts—specialists, designers or developers—in the domain, in the application, in terminals, etc. to specify all or part of the corresponding knowledge bases, possibly in the form of business rules;
2. Means of derivation: they allow the PSIC to produce particular representations from generic knowledge bases and contextual information obtained by virtue of the means of acquisition, or to produce generic knowledge bases on the basis of particular representations;
3. Means of automatic learning: they allow the PSIC to construct knowledge bases automatically by learning on examples of interaction;
4. Means of automatic revision: they allow the PSIC to review knowledge bases automatically by examining real interaction sessions and situations;
5. Means of use: they allow the PSIC to use the knowledge bases for the implementation of the means of interaction.

Figure 2:
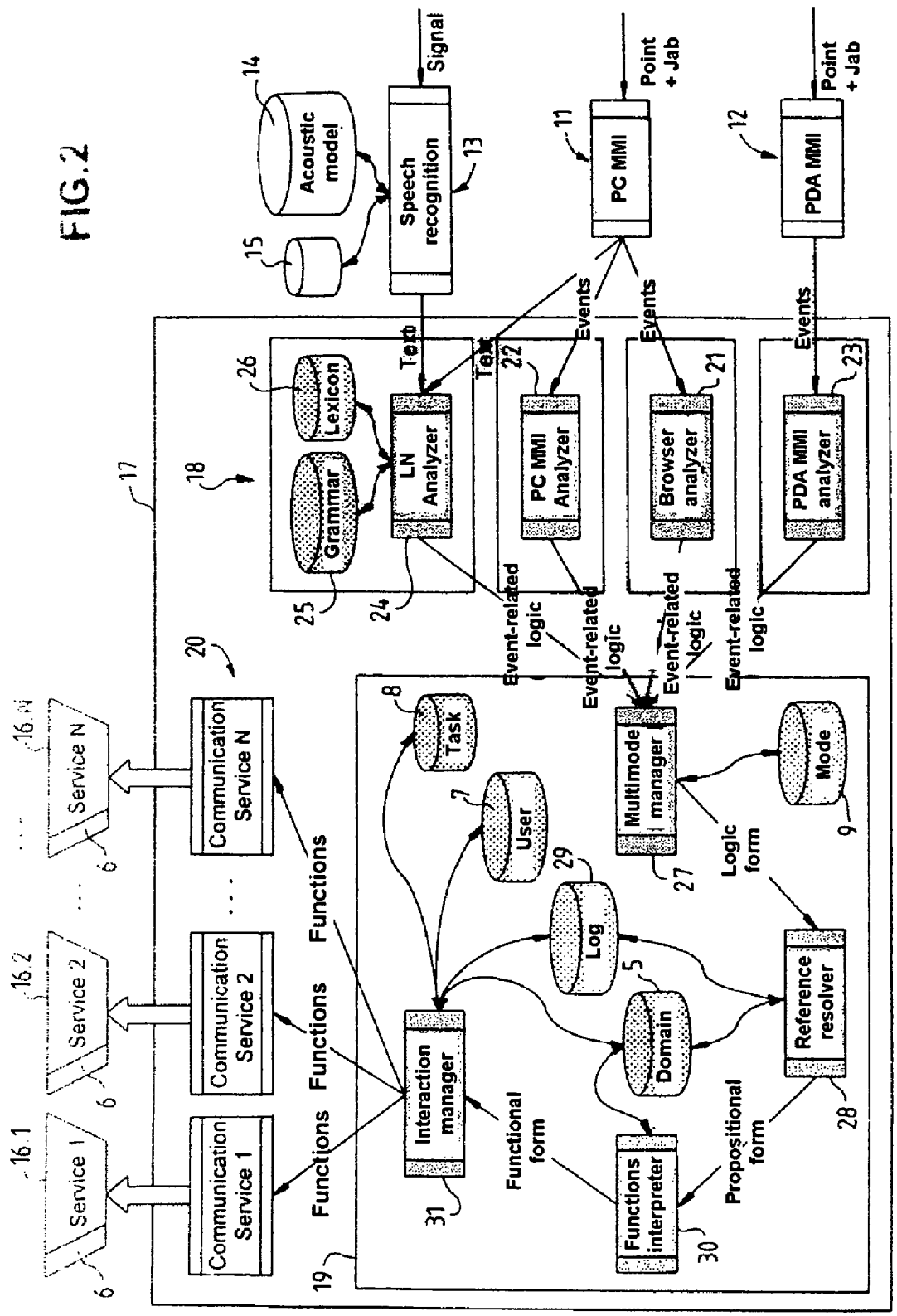
FIG. 2 is a detailed block diagram of a system in accordance with the invention and explaining the routing of the information from the user to the servers.

Represented in FIG. 2 are the elements used for the transmission of information from the user (or from the users) to the application, via the PSIC of the invention, and in FIG. 3 those relating to the transmission of information in the reverse direction.

In these FIGS. 2 and 3 has been envisaged by way of example the general case where the users of the system have at their disposal several different types of interfaces for communicating with the system: conventional interfaces 11 of personal microcomputers of the PC type (keyboard, mouse, touch screen, etc.), similar interfaces 12 of "pocket" microcomputers (PDA) and speech recognition interfaces 13 with which are associated conventional devices for managing acoustic models (14) and language models (15) for configuration. The system has been reduced to the application services 16.1 to 16.N.

The PSIC container 17 of the invention, which provides for the communication between the users and the system, comprises, in the case of FIG. 2, three functional subsets: a subset 18 for analyzing events represented by the actions of the users on the interfaces 11 to 13, a subset 19 for taking account of the actions of the users (such as transmitted by the subset 18) and for managing interaction, and a subset 20 for communicating with the services 16.1 to 16.N.

The subset 18 comprises the following functions: an analyzer 21 of the information provided by the browser of the PC and an analyzer 22 of the information transmitted by the other interfaces of the PC, an analyzer 23 of the information transmitted by the interface 12 of the PDA and an analyzer 24 of the information transmitted by the speech recognition device 13. The analyzer 24 is associated, in a conventional manner, with a grammar 25 and with a lexicon 26. Of course, should the users employ other types of interfaces (Joystick, touch screen, etc.), the subset 18 would comprise the corresponding analyzers.

It is of course also understood that a given system may be associated with a different number of MMI interfaces, or with a single type of MMI.

The analyzers of the subset 18 produce, from the events created by the various interfaces 11 to 13, event-related logic information managed by the subset 19. Firstly, a multimode manager 27, cooperating with the database of modes 9, converts the event-related logic information into logic signals that it transmits to a reference resolver 28 of multimode type (of direct, linguistic, gestural, etc. designation). This resolver 28 calls upon the domain database 5 and upon the log 29 of past actions, and it sends information in propositional form to a functions interpreter 30. The interpreter 30, by referring to the domain database 5, formulates corresponding proposals in functional form to an interaction manager 31 which devises, by referring to the databases 7, 8 and 29, calls to functions or services of the application that it sends to the various communication devices 20.

For the routing of the information provided by the services 16.1 to 16.N to the users (FIG. 3), the following functions are implemented. This information passes through the same communication devices 20 and the corresponding data are sent to the manager 31. The latter cooperates with a services planner 32, with the databases 5, 7, 8 and with filters 33. These filters 33 comprise tasks filters 34 (for example SQL) and user-related filters 35 (text filters, audio filters, etc.). The manager 31 communicates information in logic form to a modes selector 36, responsible for putting the information that has to be presented to the users into a suitable form (text, sounds, images). Accordingly, the selector 36 cooperates with the databases 9 and 10 and adapters 37 for conversion, selection, shaping, so as to provide the interfaces of the users with this information in an appropriate propositional form. This selector 36 channels the information to the various corresponding converters of a set 38 of converters. This set 38 comprises: a converter 39 for the browser of the PC, a converter 40 for the visual interfaces 11 of the PC (screens), a converter 41 for the screen of the interface 12 of the PDA and a voice converter 42 (natural language generator). The converter 42 cooperates, just like the analyzer 24, with the grammar 25 and the lexicon 26, and provides a specialized voice synthesis device 43 and/or the interface 11 of the PC with a natural language text. The device 43 cooperates with an acoustic model 44.

The function of the means of interaction is the actual effecting of the interaction services of the PSIC. These interaction services realize a whole set of intelligent processing operations which are distributed into four large classes, namely:

1—Services for adapting to the interfaces: these are all the processes that will allow the use of the various terminals and modes for interaction with the system. They comprise:

The reduction of the information flow to adapt the information to the possibilities of expression of the terminals as a function of the descriptions of these terminals;

The dispersal of the information so as to transmit the information to the various terminals, possibly wireless and/or mobile;

The management of the various modes—graphical, voice, gestural, etc.—and of the multimode feature which consists in formatting the information at output (perception) and reconstructing the information at input (action) with the aid of the descriptions of the modes;

2—Services for adapting to the users: these are all the processes that will allow interaction personalized for each particular class of users or each particular user. They comprise:

The automatic identification of users so as to make it possible to preserve the consistency of their jobs through the various changes of context of use;

The filtering of the information so as to transmit the relevant information to the users as a function of the descriptions of these users and of the task;

The learning of the behavior of the users so as to adapt the interaction services to the various users dynamically and over the duration;

3—Services supporting the users: these are all the processes that will allow the users more effective and less constraining interaction with the system. They comprise:

The automation of certain interaction procedures so as to lighten the burden of the users;

The explanation of the interaction mechanisms so as to offer the users the necessary degree of transparency required to understand and accept the behavior of the system;

Help to the users to assist them and guide them in achieving their task;

4—Services supporting work in collaboration: these are all the processes that will allow good management of multi-user interaction within the framework of group work.

To each of these classes of intelligent processing there corresponds a subset of interaction means whose manner of operation relies on intensive use of the knowledge bases identified hereinabove as well as of the data which will make it possible to obtain particular representations describing the current context. In addition to these data, the means of interaction of the PSIC update and use a log of the dialog between the user or users and the system which represents the evolution over time of the state of the interaction process.

The means of communication have the function of providing the infrastructure necessary for the implementation of the means of representation and of interaction. They allow the PSIC to propose the same interaction services regardless of the applications and the contexts of use. The means of communication take responsibility for the management of the following problems:

The centralized or distributed aspect of the architecture underlying the system;

The adaptation to wire or wireless networks;

The adaptation to the various operating systems;

The implementation of protocols for communicating with the server of the application on the one hand and the client interfaces on the other hand (terminals, peripherals, etc.).

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method for user-system interaction independent of an application and of interaction media, the user-system having at least one computing layer supporting at least one representation of a terminal and at least one representation of the application, and having at least one user interface itself supporting a piece of software, comprising the steps of:

creating, in a middleware architecture, a single container in a four-tier architecture for interaction representations, the single container managing the interaction between a determined user class and a computer system and storing at least one of the following representations of interaction context:

representation of terminals that can be used by users of the user-system, representations of modes of action, representation of modes of perception of exchanges of information by the users, representation of activity of the users, representation of context, representation of services expected, and creating a person-system interaction container (PSIC) for interaction by using the representations to construct, adapt and manipulate knowledge bases constituting a structured representation of a context of use of the user-system, and establishing, with aid of this structured representation, a dialog between users and services of the application, wherein all user system communications between the user interface and functions of the application are managed by the person-system interaction container, and wherein interaction services implemented by the person-system interaction container use at least one of the following knowledge bases:

a domain of application, an application, a user or users, a task, and modes of perception and of action offered by the terminal.

2. The method as claimed in claim 1, wherein the PSIC updates and uses a log of a dialog between user and the user-system.

3. A method of claim 1, wherein the applications and the interfaces are kept separated by the PSIC.

4. The method of claim 1, wherein the user's interface is provided by the PSIC which interprets any action on the interface and the PSIC generates calls to the application.

* * * * *